Patented Oct. 14, 1941

2,259,175

UNITED STATES PATENT OFFICE 2,259,175

TREATMENT OF RUBBER

Philip T. Paul, Naugatuck, Conn., assignor, by mesne assignments, to United States Rubber Company, New York, N. Y., a corporation of New Jersey No Drawing. Application July 7, 1937, Serial No. 152,373

7 Claims. (Cl. 260—808)

This invention relates to the treatment of rubber and similar oxidizable materials, and more particularly to a new class of deterioration retarders.

An object of the invention is to provide a new class of anti-oxidants or age resistors for organic substances which tend to deteriorate by absorption of oxygen from the air, for example goods of rubber or allied gums, unsaturated fatty oils such as unsaturated vegetable oils, essential oils, petroleum oils and their derivatives such as gasolines, soaps, aldehydes, synthetic resins, and the like. A further object of the invention is to provide chemicals which additionally act as flex-improvers or anti-flex cracking agents for vulcanized rubber such as tire treads, which undergo repeated strains during use. Further objects will be apparent from the following description.

Broadly the invention comprises incorporating in the organic substance a compound of the type formula $(R—O)_n—X$ where X represents a radical or group free of members of the carbon-silicon group of the periodic system which radical or group is capable of forming with oxygen an anhydride of an inorganic acid. As illustrative of particular preferred embodiments employing such a radical or group, the type formula may be expressed

X represents a residue from an inorganic acid such as from boric, sulphuric or phosphoric acid; O represents oxygen; R is an aryl nucleus having no substituent hydroxyl groups adjacent to O; $n$ is a whole number; A represents hydrogen, aryl or alkyl.

N is singly bonded to A and the aryl group R, and it is additionally connected to Y which may be hydrogen

a nitroso group

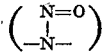

or NH2 as in the group

R may be additionally connected by a nuclear carbon atom to any of the following radicals, amino, nitro, halogen, alkoxy, (saturated or unsaturated) aryloxy, aralkoxy, secondary or tertiary alkyl amino, secondary or tertiary aryl amino, alkyl, mercapto, etc. A, where it is alkyl or aryl, may be additionally connected to other radicals, for example, in the case of aryl it may or may not be substituted by one or more hydroxyl, primary, secondary or tertiary amino, nitro, alkoxy, alkyl, aryloxy, hydroxy, alkyl, unsaturated alkyl, etc. radicals. A may also be a divalent heterocyclic group of which N is a part, for example penta methylene or oxydiethylene.

The invention, however, is more particularly concerned with esters of hydroxy substituted aromatic secondary amines and boric acid, more particularly those esters of aryl aminophenols, which are devoid of adjacent hydroxyl groups in the phenolic nucleus.

A reaction occurs between boric acid $(B_2O_3.3H_2O)$ and a hydroxy aryl compound not containing a hydroxyl group on an adjacent carbon atom. A typical illustration is the reaction between boric acid and p-hydroxy diphenylamine with the elimination of water. An intimate mixture of approximately equimolecular proportions of p-hydroxy diphenylamine and boric acid are stirred and heated on a metal bath. The bath temperature is raised to 220° C. and kept at that point until no more water is evolved. Final traces of water are eliminated by raising the bath temperature to 300° C. and lowering the pressure to 3 mm. of mercury. The product is a resinous solid.

The boric acid or an equivalent of boric oxide may be reacted in the proportion of one, two or three mols to one or two of the aryl hydroxyl compound following the above procedure to yield the corresponding esters.

The mechanism of the reaction is not definitely understood. The mechanism might involve first elimination of water from boric acid to form various meta or pyroboric acids and further reaction of these with p-hydroxydiphenylamine. Boric acid may be considered as equivalent to boric oxide plus water of crystallization and boric oxide has been found to yield the same product as boric acid when reacted as above with p-hydroxydiphenylamine.

Hence the products of reaction of the aryl amino phenols with boric acid may be a mixture of esters of the various ortho, meta and pyroboric acids, the type structure of these esters being as follows:

(a) 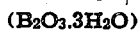

(B stands for boron)

(b) 

(c) 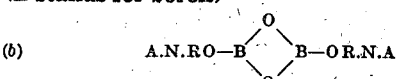

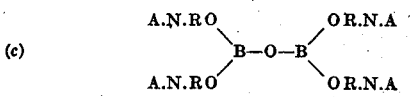

(d) 

the symbols being as already defined.

As applied to esters of ortho boric acid and p-hydroxy diphenylamine, the structures are represented as follows:

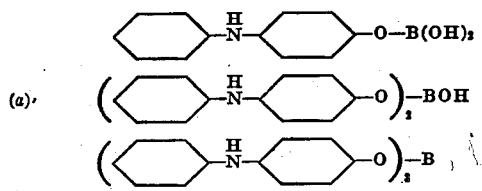

A large number of other hydroxy substituted aromatic secondary amines may be reacted with boric acid to give products for retarding the deterioration of rubber and the like, among them being the following:

1. p-p' Dihydroxy diphenylamine
2. 3-amino 4-hydroxy diphenylamine
3. 3-methyl 4-hydroxy diphenylamine
4. 2,4-diamino 4' hydroxy diphenylamine
5. 3-methyl 4-hydroxy 4' hydroxy diphenylamine
6. 3-chlor 4-hydroxy diphenylamine
7. N-chlor phenyl p-aminophenol
8. 3-nitro 4-hydroxy diphenylamine
9. 3' methyl 4-hydroxy diphenylamine
10. 3' methyl 2,4-hydroxy diphenylamine
11. p-Hydroxy p' ethyl diphenylamine
12. 2-4 dihydroxy diphenylamine
13. 2-4 dihydroxy 6-methyl 4' hydroxy diphenylamine
14. 4-4'-dihydroxy 2-2' tetra methyl diamino diphenylamine
15. 4-4'-dihydroxy 3-5 dimethyl diphenylamine
16. 4' hydroxy 3-5 dimethyl diphenylamine
17. 4-hydroxy 4' dimethylamino diphenylamine
18. 4-hydroxy 4' amino diphenylamine
19. 4-hydroxy phenyl beta naphthylamine
20. p-Hydroxy phenyl 1-8 dimethyl beta naphthylamine
21. 4-hydroxy 2-methyl phenyl beta naphthylamine
22. Phenyl p-hydroxy benzylamine
23. Hydroxy naphthyl anthracyl amine
24. 1-8 dihydroxy dibeta naphthylamine
25. p-Hydroxy p' ethyl diphenylamine
26. p-Hydroxy p' di-iso propyl diphenylamine
27. p-Hydroxy p' methyl dinaphthylamine
28. Phenyl naphthylol amine (alpha and beta)
29. 2 (tolyl amino) 1-hydroxy naphthalene
30. 7 (xylyl amino) 2-hydroxy naphthalene
31. Phenylol naphthylamine (alpha and beta)
32. Xylyl amino ethyl naphthol
33. p-Hydroxy p' methoxy diphenylamine
34. Phenylol naphthylol nitrosamine (alpha and beta)
35. 3-methoxy 4-hydroxy 4' hydroxy diphenylamine
36. 3-ethoxy 4-hydroxy diphenylamine
37. 4-4' dihydroxy 2-2' diethoxy diphenylamine
38. 4-4' dihydroxy 2-2' dimethoxy diphenylamine
39. p-Hydroxy phenyl p'-methoxy benzylamine
40. p-Hydroxy phenyl 2-7 diethoxy alpha naphthylamine
41. p-Isopropenyl p' hydroxy diphenylamine
42. p-Allyl oxy p' hydroxy diphenylamine
43. p-Phenoxy p' hydroxy diphenylamine
44. p-Hydroxy phenyl xenylamine
45. p-Hydroxy N-phenyl morpholine
46. p-Hydroxy-unsym. diphenyl hydrazine
47. p-Aminophenol The boric acid may be reacted in various proportions with the hydroxy compound, including where the hydroxy compound or the boric acid may be in molecular excess. Suitable reacting proportions are from 1 to 3 mols of the hydroxy compound and from 1 to 2 mols of boric acid.

The materials have special and outstanding properties in connection with the preservation of rubber and vulcanized rubber goods.

The effectiveness of chemicals of this class for retarding deterioration of rubber is illustrated below by the results of standard accelerated ageing and flexing tests on a commercial tire tread compound. The parts are by weight. The control stock to which various reaction products are added, comprises

| | |
|---|---|
| Smoked sheets | 100 |
| Carbon black | 45 |
| Zinc oxide | 5 |
| Pine tar | 3.50 |
| Zinc salt of cocoanut oil acids | 3.50 |
| Sulphur | 3.00 |
| Mercaptobenzothiazole | 1.00 |
| | 161.00 |

| | A | B | C | D |
|---|---|---|---|---|
| Above master batch | 161 | 161 | 161 | 161 |
| Reaction product of 1 mol. p-hydroxydiphenylamine and 1 mol. boric acid | | 1.0 | | |
| Reaction product of 2 mols. p-hydroxydiphenylamine and 1 mol. boric acid | | | 1.0 | |
| Reaction product of 3 mols. p-hydroxydiphenylamine and 1 mol. boric acid | | | | 1.0 |

Press cures were made with 30 pounds steam pressure (274° F.) for 45, 60, 75 and 90 minutes. The average percent remaining tensile was determined after ageing, as follows:

| | A | B | C | D |
|---|---|---|---|---|
| Unaged | 100 | 100 | 100 | 100 |
| Aged 96 hours, 300 lbs. oxygen, at 70° C | 19.7 | 43 | 49.3 | 54 |
| Aged 72 hours in air atmospheric pressure at 100° C | 46 | 46.5 | 51.3 | 50 |

The increase in resistance to flex-cracking in a standard flexing test for tread compounds before and after accelerated ageing is expressed as percentage of the unaged blank stock A.

| | A | B | C | D |
|---|---|---|---|---|
| Unaged | 100 | 220 | 218 | 227 |
| Aged 48 hours in oxygen bomb | 55 | 77 | 81 | 84 |
| Aged 24 hours in air at 212° | 42 | 72 | 80 | 74 |

The introduction of a boric acid radical into a hydroxy radical of an aryl nucleus which has no neighboring hydroxy group involves displacement of the hydrogen of the hydroxy group with formation of water during the reaction and the products may therefore be termed esters of the boric acid and the hydroxyl compound.

The invention may be applied for the preservation of natural rubber compositions as well as artificially-prepared rubber compositions including reclaimed rubbers, and latices of such rubber compositions.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A rubber composition containing prior to vulcanization a compound which is an ester reaction product of a boric acid and a monohydroxy ring substituted aromatic secondary amine.

2. A method of preserving an organic substance which tends to deteriorate by absorption of oxygen from the air which comprises incorporating therein a compound having the type formula

where R is an arylene nucleus free from hydroxyl groups in the positions ortho to the oxygen; $n$ is 1; A represents an aryl group; N is nitrogen, and X is $-B(OH)_2$.

3. A method of preserving an organic substance which tends to deteriorate by absorption of oxygen from the air which comprises incorporating therein a compound having the type formula

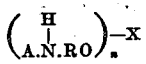

where R is an arylene nucleus free from hydroxyl groups in the positions ortho to the oxygen; $n$ is 2; A represents an aryl group; N is nitrogen; and X is $=BOH$.

4. A method of preserving an organic substance which tends to deteriorate by absorption of oxygen from the air which comprises incorporating therein a compound having the type formula

where R is an arylene nucleus free from hydroxyl groups in the positions ortho to the oxygen; $n$ is 3; A represents an aryl group; N is nitrogen; and X is $-B$.

5. A method of preserving rubber which comprises incorporating therein a secondary aromatic amine having an aryl group bonded by means of oxygen to boron of a boron-containing radical derived from a boric acid, said aryl group having its nucleus free of substituent hydroxyl groups in the positions ortho to the oxygen.

6. A method of preserving an organic substance which tends to deteriorate by absorption of oxygen from the air which comprises incorporating therein a diarylamine having an aryl group directly bonded to oxygen which is singly bonded to boron of a boron-containing radical derived from boric acid, said aryl group having its nucleus free of substitutent hydroxyl groups in the positions ortho to the oxygen.

7. A method of preserving rubber which comprises incorporating therein a diarylamine having an aryl group directly bonded to oxygen which is singly bonded to boron of a boron-containing radical derived from boric acid, said aryl group having its nucleus free of substituent hydroxyl groups in the positions ortho to the oxygen.

PHILIP T. PAUL.